United States Patent
Pylappan et al.

(10) Patent No.: US 9,582,061 B2
(45) Date of Patent: Feb. 28, 2017

(54) ADAPTIVE FRAME RATE CONTROL FOR POWER SAVINGS

(75) Inventors: Seejo K. Pylappan, Cupertino, CA (US); Aroon Pahwa, Palo Alto, CA (US); Christopher Blumenberg, San Francisco, CA (US); Gregory Bolsinga, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 423 days.

(21) Appl. No.: 13/492,793

(22) Filed: Jun. 8, 2012

(65) Prior Publication Data

US 2013/0328845 A1    Dec. 12, 2013

(51) Int. Cl.
*G06F 1/32* (2006.01)

(52) U.S. Cl.
CPC .................. *G06F 1/3203* (2013.01)

(58) Field of Classification Search
CPC ... G09G 2320/0613; G09G 2340/0435; H04N 7/0127
USPC ........................................................ 345/204
See application file for complete search history.

(56) References Cited

U.S. PATENT DOCUMENTS

| | | | |
|---|---|---|---|
| 4,532,514 A * | 7/1985 | Hatano | G01C 21/367 340/995.19 |
| 6,456,340 B1 * | 9/2002 | Margulis | 348/745 |
| 7,034,791 B1 * | 4/2006 | Odom | G09G 5/14 345/100 |
| 2006/0274075 A1 * | 12/2006 | Yamazaki et al. | 345/543 |
| 2008/0055318 A1 * | 3/2008 | Glen | 345/501 |
| 2008/0165106 A1 * | 7/2008 | Park et al. | 345/89 |
| 2010/0161208 A1 * | 6/2010 | Akita et al. | 701/201 |
| 2010/0245316 A1 * | 9/2010 | Cheng | G09G 3/3648 345/211 |
| 2010/0253611 A1 * | 10/2010 | Takagi | G09G 3/3611 345/98 |
| 2011/0032231 A1 * | 2/2011 | Maruyama et al. | 345/208 |
| 2011/0112750 A1 * | 5/2011 | Lukassen | 701/200 |
| 2011/0148846 A1 * | 6/2011 | Arasawa et al. | 345/212 |
| 2011/0267452 A1 * | 11/2011 | Notsu et al. | 348/116 |
| 2013/0182182 A1 * | 7/2013 | Mountain | H04N 21/44008 348/564 |

* cited by examiner

*Primary Examiner* — Claire X Pappas
*Assistant Examiner* — Robert Stone
(74) *Attorney, Agent, or Firm* — Blank Rome LLP

(57) ABSTRACT

Embodiments disclosed herein pertain to power conservation for electronic devices. According to one embodiment, power conservation can be achieved through adaptive frame rate control for a display associated with an electronic device. The frame rate is able to be controlled so as to adapt to a frame rate that is adequate for the display task. Since the display often times displays content that is not very dynamic, the frame rate in such situations can be controlled to use a reduced frame rate, which thereby reduces power consumption. However, when the display displays content that is substantially dynamic, the frame rate in such situations can be controlled to use an enhanced (or not reduced) frame rate, which ensures reasonable display quality.

25 Claims, 6 Drawing Sheets

ADAPTIVE FRAME RATE CONTROL FOR POWER SAVINGS

BACKGROUND OF THE INVENTION

Conventionally, portable electronic devices, such as cellular phones, portable computers, portable digital assistants or portable media players, have displays that are controlled to display video or animated content at 60 frames per second. The processing performed by a portable electronic device to produce and display each frame consumes power. Since portable electronic devices are often battery powered, the display of video or animated content is very power intensive. As a result, the stored power of a battery used to power the portable electronic device can be consumed relatively quickly when used to display video or animated content. While the frame rate could be set to a predetermined lower frame rate to reduce power, lower frame rates can cause poor quality display of video or animated content. Thus, there is a need for improved techniques to reduce power consumption, and thus conserve battery power, of portable electronic devices, while avoiding poor quality display.

SUMMARY

Embodiments disclosed herein pertain to power conservation for electronic devices. According to one embodiment, power conservation can be achieved through adaptive frame rate control for a display associated with an electronic device. The frame rate is able to be controlled so as to adapt to a frame rate that is adequate for the display task. Since the display often times displays content that is not very dynamic, the frame rate in such situations can be controlled to use a reduced frame rate, which thereby reduces power consumption. However, when the display displays content that is substantially dynamic, the frame rate in such situations can be controlled to use an enhanced (or not reduced) frame rate, which ensures reasonable display quality.

The invention can be implemented in numerous ways, including as a method, system, device, apparatus (including computer readable medium and graphical user interface). Several embodiments of the invention are discussed below.

As a method for controlling frame rate for dynamic data displayed on a display of a computing device, one embodiment can, for example, include at least the operations of: evaluating a characteristic of data to be displayed; adaptively determining a frame rate to be used based on the characteristic of the data; setting the frame rate to the determined frame rate; and subsequently displaying the data in accordance with the determined frame rate.

As a method for controlling frame rate for dynamic data displayed on a display of a computing device, another embodiment can, for example, include at least the operations of: setting a frame rate to a reduced frame rate; evaluating a characteristic of data to be displayed; determining whether an enhanced frame rate should be used based on the characteristic of the data; setting the frame rate to the enhanced frame rate if the determining determines that the enhanced frame rate should be used; and subsequently displaying the data in accordance with the set frame rate.

As a method for controlling frame rate for dynamic data displayed on a display of a computing device, another embodiment can, for example, include at least the operations of: launching a navigation application for operation on the computing device, the navigation application operates to present navigation information to a user of the computing device via at least the display; setting a frame rate for the display to a reduced frame rate; obtaining a navigation data set to be displayed on the display; evaluating at least one characteristic of the navigation data set; determining whether an enhanced frame rate should be used based on at least the at least one characteristic of the navigation data set; setting the frame rate for the display to an enhanced frame rate if the determining determines that the enhanced frame rate should be used, the enhanced frame rate being significantly greater than the reduced frame rate; and displaying the navigation data set on the display in accordance with the set frame rate.

As a non-transitory computer readable medium including at least computer program code stored therein for controlling frame rate for dynamic data to be displayed on a display associated with a computing device, one embodiment can, for example, include at least: computer program code for evaluating a characteristic of data to be displayed; computer program code for adaptively determining a frame rate to be used based on the characteristic of the data; computer program code for setting the frame rate to the determined frame rate; and computer program code for subsequently displaying the data in accordance with the determined frame rate.

As a portable electronic device, one embodiment can, for example, include at least: a display; a display controller operatively connected to the display, the display controller configured to control the display; a memory for storage of data, at least a portion of the data stored in the memory including executable computer code; a processor operatively connected to the memory and the display controller, the processor configured to execute the executable computer code; and a dynamic frame rate controller implemented in a portion of the executable computer code stored in the memory. The dynamic frame rate controller can be configured to at least (i) evaluate a characteristic of data to be displayed, (ii) adaptively determine a frame rate to be used based on the characteristic of the data, and (iii) set the frame rate to the determined frame rate. The display controller is configured to display the data on the display in accordance with the determined frame rate.

Other aspects and advantages of embodiment of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF EMBODIMENTS OF THE INVENTION

Embodiments disclosed herein pertain to power conservation for electronic devices. According to one embodiment, power conservation can be achieved through adaptive frame rate control for a display associated with an electronic device. The frame rate is able to be controlled so as to adapt to a frame rate that is adequate for the display task. Since the display often times displays content that is not very dynamic, the frame rate in such situations can be controlled to use a reduced frame rate, which thereby reduces power consumption. However, when the display displays content that is substantially dynamic, the frame rate in such situations can be controlled to use an enhanced (or not reduced) frame rate, which ensures reasonable display quality.

According to one embodiment, an application program operating on an electronic device can control content to be displayed. The application can evaluate whether a reduced frame rate is acceptable from a display quality perspective. If a reduced frame rate is acceptable, the content to be displayed can be displayed using the reduced frame rate which conserves power of the electronic device.

The invention is well suited for a portable electronic device that can support multiple functions. In one embodiment, the invention is suitable for use with a portable electronic device having at least wireless voice communication capability and media playback capability. The portable electronic device can, for example, be a portable media device (e.g., digital music player or MP3 player) having wireless voice communications. In another embodiment, the portable electronic device can be a wireless communications device (e.g., cellular phone) having media playback capabilities. In still another embodiment, the portable electronic device can be a portable electronic device having media playback capability and workout support via a workout manager. These portable electronic devices can also have other functions (e.g., applications), such as functions supporting electronic calendars, electronic appointments, network browsers, network data transfers, VoIP applications, etc.

Embodiments of the invention are discussed below with reference to FIGS. 1-6. However, those skilled in the art will readily appreciate that the detailed description given herein with respect to these figures is for explanatory purposes as the invention extends beyond these limited embodiments.

Figure 1:
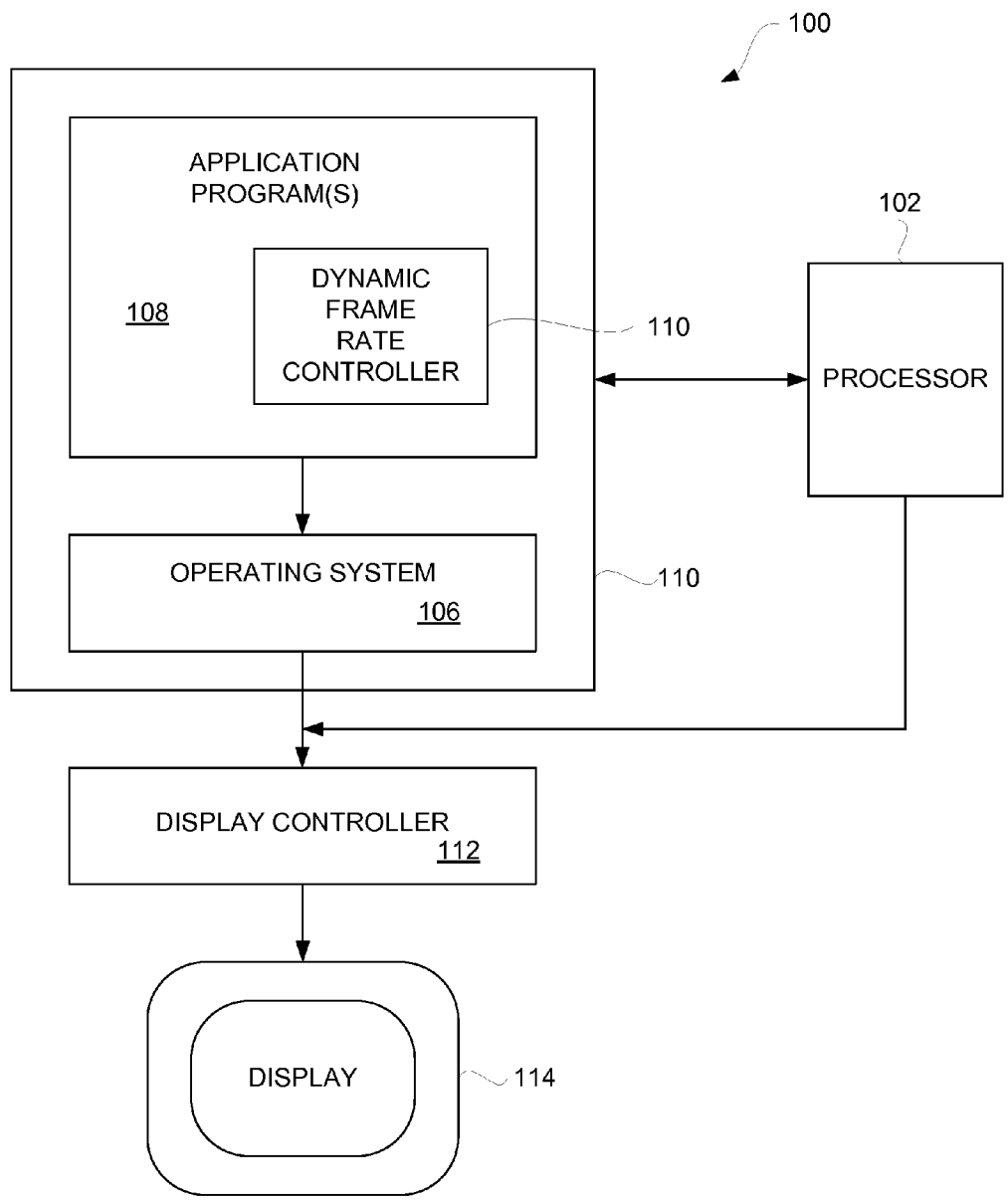
FIG. 1 is a block diagram of an electronic device according to one embodiment.

FIG. 1 is a block diagram of an electronic device 100 according to one embodiment. The electronic device 100 is typically a computing device. The electronic device 100 can be implemented as a portable navigation aide, a media player, a mobile telephone, a portable game player, portable workout manager, and the like.

As illustrated in FIG. 1, the electronic device 100 can include a processor 102 that controls the overall operation of the electronic device 100. The processor 102 is coupled to memory 104. The memory 104 can include one or more of semiconductor memory (e.g., FLASH, EPROM, etc.) or disc drive memory (e.g., hard drive). The memory 104 can store an operating system 106 and one or more application programs 108. The operating system 106 can pertain to computer program code that is executed by the processor 102 to perform basic operations of the electronic device 100. Additionally, the processor 102 can also execute the one or more application programs 108. An application program 108 typically interacts with the operating system 102 which in turn interacts with hardware of the electronic device 100 for various operations, such as input and/or output operations. The one or more application programs 108 also can each include a dynamic frame rate controller 110. The dynamic rate frame controller 110 can be embedded within the corresponding application program 108 and serve to provide frame rate control for power savings as further discussed herein.

The electronic device 100 also includes a display controller 112 and a display 114. The display controller 112 can be controlled by the operating system 106 and/or the one or more application programs 108 to present information on the display 114. In the case of dynamic content, such as videos, animations or other dynamic visual content, often the display controller 112 controls the presentation of the information on the display 114 on a frame-by-frame basis. Conventionally, the rate at which frames are presented is on the order of 60 frames per second. The frame rate corresponds to the amount of power consumed by the electronic device 100. That is, the greater the frame rate, the greater the amount of power used to display the content on the display 114. However, when the information to be displayed by the display 114 is not actively dynamic, it is advantageous to lower the frame rate to conserve power but yet not noticeably deteriorating the quality of the presentation of the information on the display 114. Accordingly, the dynamic frame rate controller 110, which is provided with the one or more applications 108, can serve to intelligently control the frame rate utilized by the display controller 112. In particular, in cases where the information to be presented on the display 114 is not very dynamic, the frame rate utilized by the display controller 112 can be reduced (i.e., low frame rate). For example, in one implementation, the reduced frame rate (or low frame rate) can be in the range of about 10 to 40 frames per second. On the other hand, in cases where the information to be presented on the display 114 is substantially dynamic, the frame rate utilized by the display controller 112 can be enhanced as compared to the reduced frame rate. For example, in one implementation, the enhanced frame rate can be in the range of about 40 to 60 frames per second. The enhanced frame rate can also be considered the standard frame rate (e.g., 60 frames per second).

Still further, the dynamic frame rate controller 112 can also dynamically control the frame rate to be utilized. More particularly, as the one or more application programs 108 operate on the electronic device 100, the dynamic frame rate controller 110 can actively determine whether a reduced frame rate is appropriate, and if so, cause the display controller 112 to utilize the reduced frame rate. In doing so, the dynamic frame rate controller 106 can understand when a reduced frame rate is not appropriate, and in such cases can use an enhanced frame rate. Through such dynamic control of the frame rate, the frame rate adapts to the display needs of the one or more application programs 108 operating on the electronic device 100. Hence, those application programs 108 that at times require higher frame rates can be satisfied, yet the overall average frame rate is reduced through the frame rate control provided by the dynamic frame rate controller 112.

In an alternative embodiment, the dynamic frame rate controller 110 can be provided in a centralized manner so it need not be separately provided within each of the one or more application programs 108 that desire to operate with more power efficiency. For example, in one implementation, the dynamic frame rate controller 110 can be provided within the operating system 106 or a centrally accessible application program.

Figure 2:
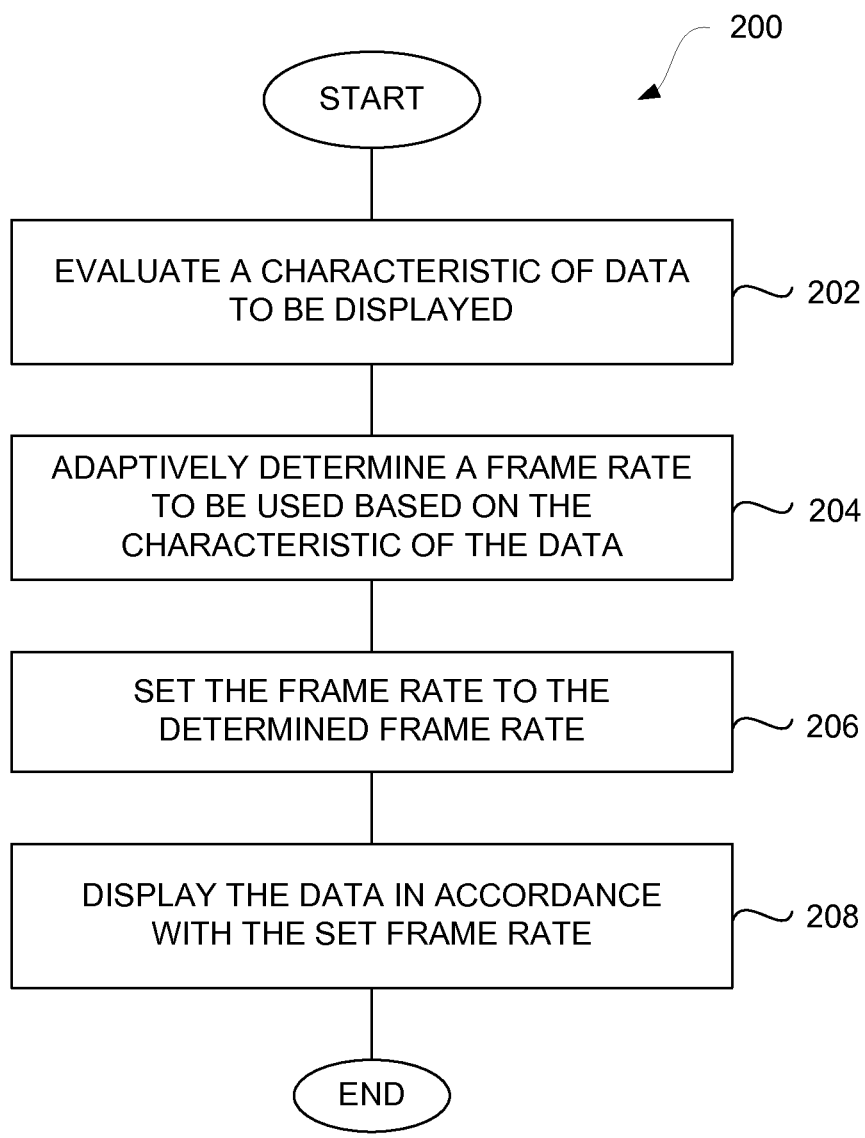
FIG. 2 is a flow diagram of a frame rate control process according to one embodiment.

FIG. 2 is a flow diagram of a frame rate control process 200 according to one embodiment. The frame rate control process 200 can, for example, be performed by an electronic device, such as the electronic device illustrated in FIG. 1.

The frame rate control process 200 can evaluate 202 a characteristic of the data to be displayed. In one implementation, the characteristic of the data is reflective of an appropriate frame rate. That is, the characteristic can correspond to degree of animation or how much a change in data to be displayed is, will or has occurred. Next, a frame rate can be adaptively determined 204 based on the characteristic of the data. That is, depending upon the characteristics of the data to be displayed, the appropriate frame rate can be determined. For example, if the characteristic of the data indicates that the data is significantly active, the frame rate can be relatively high, such as on the order of 60 frames per second. On the other hand, for example, if the characteristic of the data indicates that the data is substantially inactive, the frame rate can be relatively low, such as on the order of 15-30 frames per second. For example, a large angle means more motion or animation, and therefore processing of the large angle can use a higher frame rate (see FIG. 5 below).

After the frame rate is adaptively determined 204, the frame rate can be set 206 to the determined frame rate. Thereafter, the data can be displayed 208 in accordance with the set frame rate. Following the block 208, the frame rate control process 200 can end.

Figure 3:
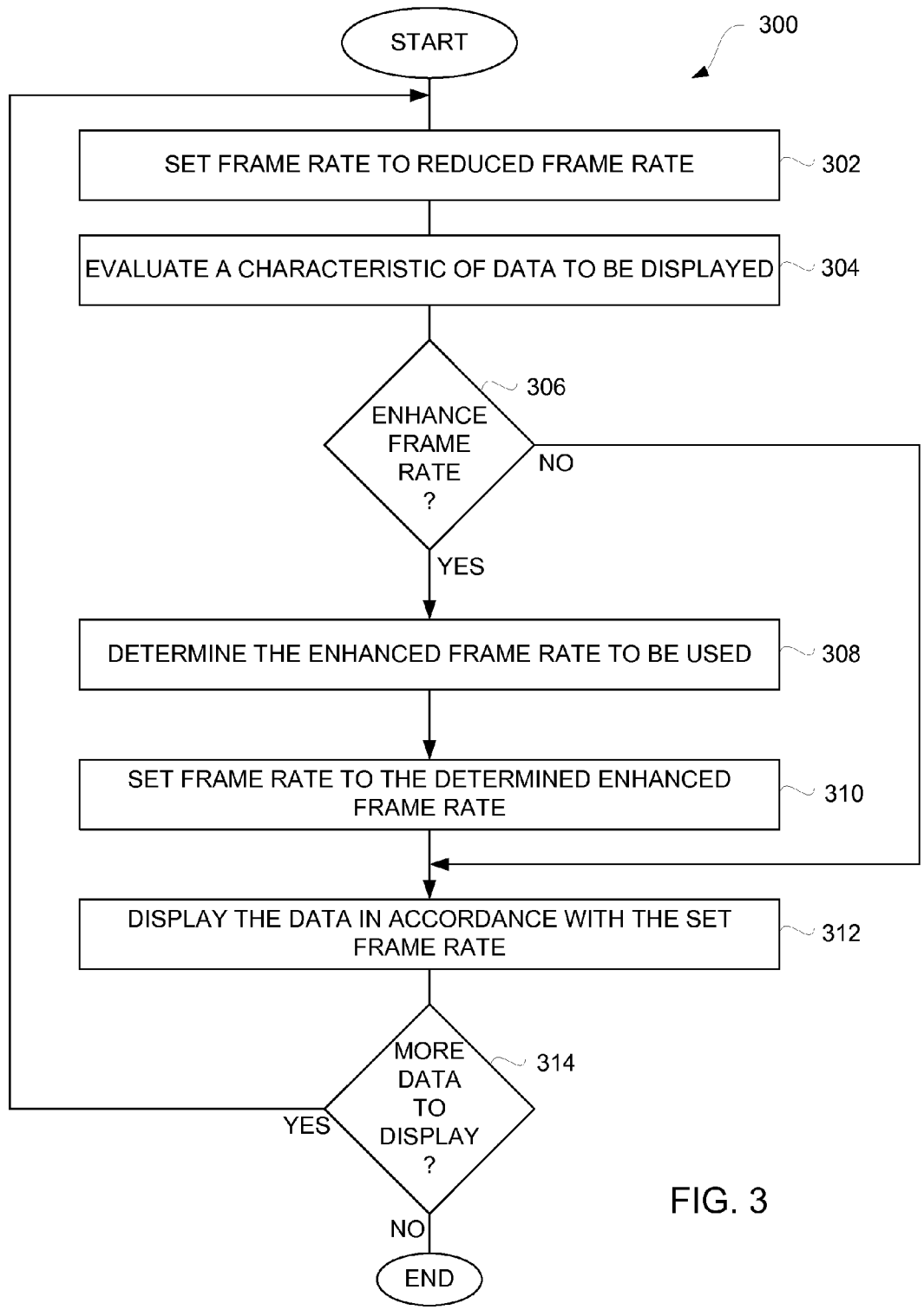
FIG. 3 is a flow diagram of a frame rate control process according to one embodiment.

FIG. 3 is a flow diagram of a frame rate control process 300 according to one embodiment. The frame rate control process 300 can, for example, be performed by an electronic device, such as the electronic device illustrated in FIG. 1.

The frame rate control process 300 can set 302 a frame rate to a reduced frame rate. Here, the reduced frame rate is effectively set to a default frame rate for baseline operation of the electronic device. In addition, during subsequent operation of the electronic device, further processing is carried out to determine when a greater frame rate should be utilized. According to the frame rate control process 300, a characteristic of data to be displayed can be evaluated 304. In one implementation, the characteristic of the data is reflective of an appropriate frame rate. That is, the characteristic can correspond to degree of animation or how much a change in data to be displayed is, will or has occurred. As described above, example characteristics of data that is reflective of an appropriate frame rate can include angular change in direction or curvature.

A decision 306 can determine whether an enhanced frame rate should be utilized. When the decision 306 determines that an enhanced frame rate should be utilized, the enhanced frame rate to be utilized can be determined 308. Here, the nature or degree of an enhancement to the reduced frame rate can be determined. That is, depending upon the characteristics of the data to be displayed, the appropriate frame rate can be determined. In many cases, the characteristic of the data indicates that the reduced frame rate is adequate. In other cases, the enhanced frame rate can be determined based on the characteristic of the data. As an example, if the data pertains to navigation data with directional changes in the navigation steps, those navigation steps have direction changes greater than sixty degrees (60°) can use the enhanced frame rate. For example, the reduced frame rate could be 15 frames/second, and the enhanced frame rates can be greater than 15 frames per second. For example, the enhanced frame rate determined can be greater than 30 frames per second, such as 30, 45 or 60 the frame rates.

In any case, after the enhanced frame rate has been determined 308, the frame rate can be set 310 to the determined enhanced frame rate. Thereafter, the data can be displayed 312 in accordance with the set frame rate. Next, a decision 314 can determine whether more data is to be displayed. When the decision 314 determines that more data is to be displayed, the frame rate control process 300 can return to repeat the above processing at blocks 302-214 for a new block or set of data to be displayed. Alternatively, once the decision 314 determines that there is no more data to be displayed, the frame rate control process 300 can end.

Figure 4:
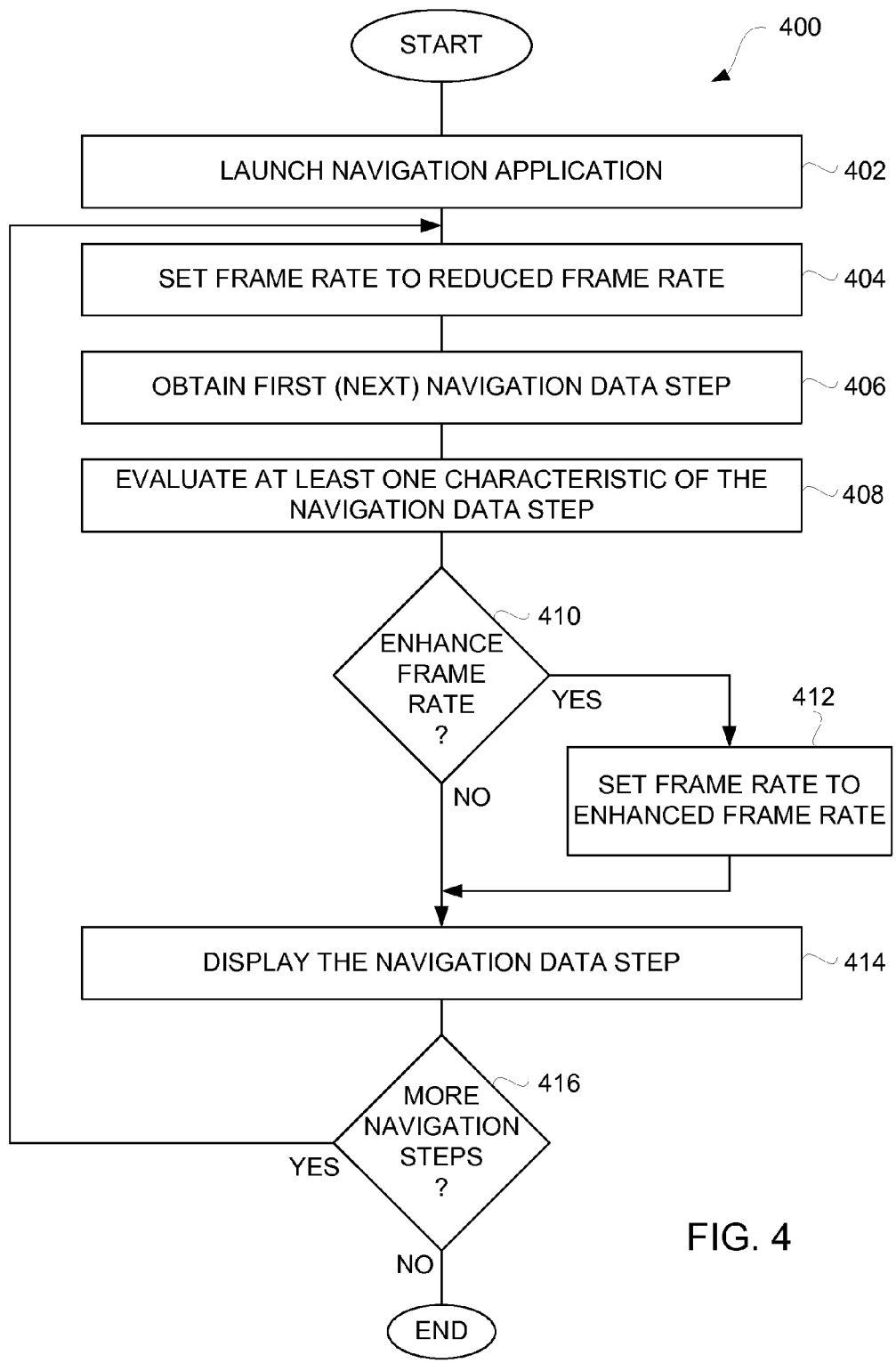
FIG. 4 illustrates a flow diagram of a navigation data display process according to one embodiment.

FIG. 4 illustrates a flow diagram of a navigation data display process 400 according to one embodiment. The navigation data display process 400 can be performed by an electronic device, such as the electronic device 100 illustrated in FIG. The navigation data display process 400 can launch 402 a navigation application. The navigation application is an application program operating on the electronic device. For example, the navigation application can operate to provide turn-by-turn navigation directions to a user. Next, a frame rate can be initially set 404 to a reduced frame rate. Here, the frame rate being set is for use by at least the navigation application. That is, as information is presented on a display for a user of the application, the display is updated with such information at the set frame rate. The reduced frame rate can be set to any of a variety of different rates, but in any case such "reduced" frame rates are less than a conventional frame rate, e.g., 60 frames per second. For example, the reduced frame rate can be not more than one-half of an enhanced frame rate.

The navigation data display process 400 can launch 402 a navigation application. The navigation application is an application program operating on the electronic device. For example, the navigation application can operate to provide turn-by-turn navigation directions to a user. Next, a frame rate can be initially set 404 to a reduced frame rate. Here, the frame rate being set is for use by at least the navigation application. That is, as information is display for a user of the application, the display is updated with such information at the set frame rate. The reduced frame rate can be set to any of a variety of different rates, but in any case such "reduced" frame rates are less than a conventional frame rate, e.g., 60 frames per second. For example, the reduced frame rate can be not more than one-half of an enhanced frame rate.

After the frame rate has been set 404 to the reduced frame rate, a first navigation data step can be obtained 406. The first navigation data step is a block of data representing a step or segments of a directional route being presented to the user by the navigation application. The navigation data steps can be descriptive road information for a segment of the directional route (e.g., path). Each of the navigation data steps can represent a portion of the directional route being taken from a departure position to an arrival position. The navigation data typically includes a plurality of navigation data steps. Next, at least one characteristic of the navigation data step can be evaluated 408. The at least one characteristic of the data is, for example, reflective of an appropriate frame rate. That is, the characteristic can correspond to degree of animation or how much a change in data to be displayed is, will or has occurred.

Next, a decision 410 determines whether an enhanced frame rate should be utilized. When the decision 410 determines that an enhanced frame rate should be utilized, the frame rate is set 412 to an enhanced frame rate. Following the decision 410 when the frame rate is not to be enhanced, or after the frame rate is set 412 to be the enhanced frame rate, the navigation data step can then be displayed 414. A decision 416 can then determine whether there are more navigation steps to be processed.

When the decision 416 determines that there are more navigation steps to be processed, the navigation data display process 400 can return to repeat the block 404 and subsequent blocks so that each of the subsequent navigation steps can be processed. Each navigation step can associated with a block of data, and thus the navigation data display process 400 can sequentially process sequential blocks of data. As a result, the frame rate can be controlled to adaptive control frame rate on a block-by-block basis. Alternatively, when the decision 416 determines that there are no more navigation steps to be processed, the navigation data display process 400 can end.

Figure 5:
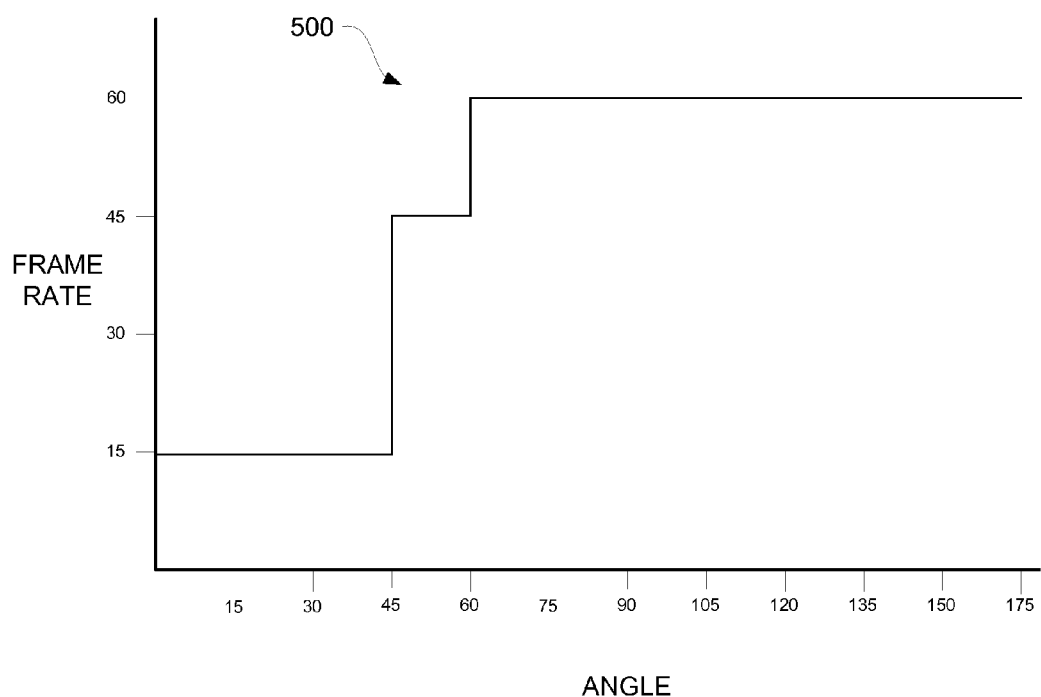
FIG. 5 illustrates a graph according to one embodiment.

FIG. 5 illustrates a graph 500 according to one embodiment. The graph 500 depicts frame rate versus angle. The angle can be supplied with data to be displayed or can be computed from the data to be displayed. The angle represents a characteristic of the data being displayed. In general, as the angle associated with the data being displayed increases, the more movement or animation associated with the data being displayed. As result, and as shown by the graph 500, as the angle increases, the frame rate also increases. More specifically, the frame rate provided in the graph 500 is set to one of three levels. Namely, the frame rate is set to a first level, which corresponds to a default or reduce frame rate, when the angle is less than or equal to 45°. The frame rate is set to a second level, which corresponds to an intermediate enhanced frame rate, when the angle is between 45° and 60°. The frame rate is also set to the third level, which corresponds to the full enhanced frame rate, or conventional frame rate, when the angle is greater than 60°. In the particular example illustrated in FIG. 5, the frame rate at the first level represents 15 frames per second; the frame rate at the second level represents 45 frames per second; and the frame rate at the third level represents 60 frames per second.

The electronic device as described herein can be a computing device capable of executing application programs. The computing device can support multiple functions, such as wireless communications, media playback/recording, navigation, games, and various others.

The electronic device as described herein can be a wireless communication device (e.g., portable telephone) capable of communication over a network. The wireless communication device can also be a computing device capable of executing application programs.

The electronic device as described herein can be a media device (e.g., media player) capable of playing (including displaying) media items. The media items can pertain to audio items (e.g., audio files or songs), videos (e.g., movies) or images (e.g., photos). The media device can also include other functions such as wireless communications.

In one embodiment, the electronic device is a portable electronic device. In one implementation, the portable electronic device is a handheld electronic device. Often, portable electronic devices are handheld electronic devices that can be easily held by and within a single hand of a user. The portable electronic device can also pertain to a wearable electronic device or a miniature electronic device. However, embodiments of the invention can apply to electronic devices whether portable or not.

Figure 6:
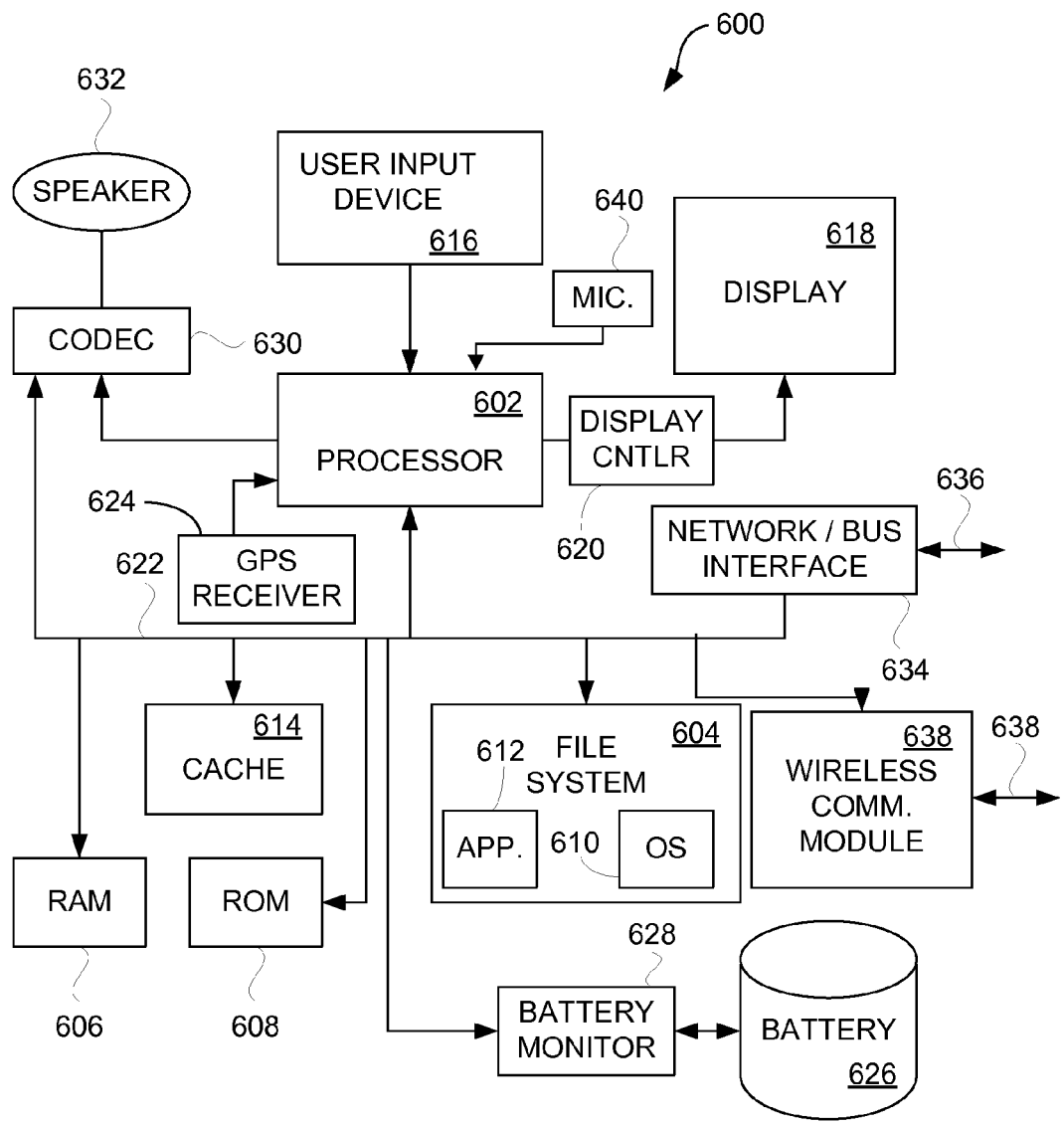
FIG. 6 is a block diagram of computing device according to one embodiment of the invention.

FIG. 6 is a block diagram of computing device 600 according to one embodiment of the invention. Computing device 600 can perform the operations described with reference to FIGS. 2-4.

Computing device 600 can include processor 602 that pertains to a microprocessor or controller for controlling the overall operation of computing device 600. Computing device 600 can include memory to provide data storage for data (including media data pertaining to media items) and computer programs. The memory can be provided by a file system 604, Random-Access Memory (RAM) 606 and Read-Only Memory (ROM) 608. File system 604 typically provides high capacity storage capability for computing device 600. File system 604 is, typically, a storage disk or a plurality of disks, but more recently can be semiconductor memory (e.g., FLASH). File system 604 can provides high capacity non-volatile storage for programs, utilities and data. Typically, file system 604 stores operating system 610 as well as one or more application programs 612 that can be executed by computing device 600. ROM 608 can store programs, utilities or processes to be executed in a non-volatile manner. ROM 608 can also provide non-volatile data storage. RAM 606 provides volatile data storage, such as temporary data and program storage. RAM 606 and ROM 608 can be provided by semiconductor memory. Computing device 600 can also include cache 614. Cache 614 is, for example, provided for in RAM 606. The relative access time to cache 614 can be substantially shorter than for file system 604. However, cache 614 does not have the large storage capacity of file system 604. Further, file system 604, when active, consumes more power than does cache 614. Power consumption is often a concern when computing device 600 is a portable computing device that is powered by battery 607.

Computing device 600 can also include user input device 616 that allows a user of computing device 600 to interact with computing device 600. For example, user input device 616 can take a variety of forms, such as a button, keypad, dial, etc. (physical or soft implementations) each of which can be programmed to individually or in combination perform any of a suite of functions. In one implementation, user input device 616 can be provided by one or more buttons or dials. In another implementation, user input device 616 can be implemented as a touchpad (i.e., a touch-sensitive surface). In still another implementation, user input device 616 can be implemented as a combination of one or more physical buttons as well as a touchpad. In yet another embodiment, user input device 616 can serve to receive voice inputs.

Still further, computing device 600 can include display 618 (display screen) that can be controlled by display controller 620. Display controller 620 is coupled to processor 602 and to display 618. Processor 602 controls display controller 620, and display controller 620 controls the display information on display 618 for the user of computing device 600.

Computing device 600 can also include data bus 622 which can facilitate data transfer between at least file system 604, RAM 606, ROM 608, cache 614, processor 602, and CODEC 612. GPS receiver 624 can also be include and coupled to processor 602 and operable to acquire position information.

Computing device 600 can also provide status monitoring of battery 626. In this regard, computing device 600 can include battery monitor 628. Battery monitor 628 can be operatively coupled to battery 626 to monitor conditions. Battery monitor 628 can, for example, communicate battery status (or conditions) with processor 602.

In one embodiment, computing device 600 can serve to store a plurality of media items (e.g., songs) in file system 604. When a user desires to have computing device 600 play a particular media item, a list of available media items can be displayed on display 618. Then, using user input device 616 (or voice commands), a user can select one of the available media items. Processor 602, upon receiving a selection of a particular media item, can supply the media data (e.g., audio file) for the particular media item to coder/decoder (CODEC) 630. CODEC 630 can then produce analog output signals for speaker 632. Speaker 632 can be a speaker internal or external to computing device 600. For example, headphones or earphones that connect to computing device 600 could be considered an external speaker. Speaker 632 can not only be used to output audio sounds pertaining to the media item being played, communications, or notifications to user.

Computing device 600 can also include network/bus interface 634 that couples to data link 636. Data link 636 can allow computing device 600 to couple to a host computer. Data link 636 can be provided over a wired connection or a wireless connection. In the case of a wireless connection, network/bus interface 636 can include a wireless transceiver.

To support wireless communications, computing device 600 can also include wireless communications module 638. Wireless communication module 638 can be considered to provide voice communications (e.g., calls via a cellular network), whereas network/bus interface 636 can be considered to provide data communications. A user of computing device 600 can thus make and receive voice calls using the wireless communications module in computing device 600. Wireless communications module 638 can also couple to data bus 622 to couple to processor 602 and other resources. Computing device 600 can also include microphone 640 for pickup of the user's voice.

In one embodiment, computing device 600 is a portable computing device that can support processing media, such as audio. For example, computing device 600 can be a music player (e.g., MP3 player), a game player, and the like. These devices are generally battery operated and highly portable so as to allow a user to listen to music, play games or video, record video or take pictures wherever the user travels.

In one implementation, computing device 600 is a handheld device sized for placement into a pocket or hand of the user. By being handheld, computing device 600 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, in one implementation, the device may be operated by the user's hands; no reference surface such as a desktop is needed.

Embodiments of the invention are suitable for use with battery-powered electronic devices. However, the invention is particularly well suited for handheld electronic devices, such as a handheld media device. One example of a handheld media device is a portable media player (e.g., music player or MP3 player). Another example of a handheld media device is a mobile telephone (e.g., cell phone) or Personal Digital Assistant (PDA). One example of a mobile telephone is the iPhone® mobile telephone, which is available from Apple Inc. of Cupertino, Calif.

Portable media devices can store and play audio sounds pertaining to media assets (media items), such as music, audiobooks, meeting recordings, and other speech or voice recordings. Portable media devices, such as media players, are small and highly portable and have limited processing resources. Often, portable media devices are handheld media devices which can be easily held by and within a single hand of a user. One example of a portable media player is the iPod® media player, which is available from Apple Inc. of Cupertino, Calif. As another example, a mobile telephone (e.g., iPhone® mobile telephone) can also support media playback and operate as a portable media player. Often, a media player acquires its media assets from a host computer that serves to enable a user to manage media assets. As an example, the host computer can execute a media management application to utilize and manage media assets. One example of a media management application is iTunes®, produced by Apple Inc.

The various aspects, embodiments, implementations or features of the invention can be used separately or in any combination.

In view of the foregoing, it will readily be known that an electronic device provided in accordance with one or more embodiments can, for example, be a computing device (e.g., personal computer), mobile phone (e.g., cellular phone, smart phone), personal digital assistant (PDA), media player (e.g., music, videos, games, images), media storage device, camera, and/or the like. An electronic device may also be a multi-functional device that combines two or more of these device functionalities into a single device. A portable electronic device may support various types of network communications.

A portable electronic device can be provided as a hand-held electronic device. The term hand-held can generally refer to an electronic device with a form factor that is small enough to be comfortably held in one hand. A hand-held electronic device may be directed at one-handed operation or two-handed operation. In one-handed operation, a single hand is used to both support the device as well as to perform operations with the user interface during use. In two-handed operation, one hand is used to support the device while the other hand performs operations with a user interface during use or alternatively both hands support the device as well as perform operations during use. In some cases, the hand-held electronic device is sized for placement into a pocket of the user. By being pocket-sized, the user does not have to directly carry the device and therefore the device can be taken almost anywhere the user travels (e.g., the user is not limited by carrying a large, bulky and often heavy device).

Digital media assets (e.g., digital media items) can, for example pertain to video items (e.g., video files or movies), audio items (e.g., audio files or audio tracks, such as for songs, musical albums, podcasts or audiobooks), or image items (e.g., photos).

The invention can be implemented by software, hardware, or a combination of hardware and software. The invention can also be embodied as computer readable code on a computer readable medium. The computer readable medium, which is non-transitory, is any data storage device that can store data which can thereafter be read by a computer system. Examples of the computer readable medium generally include read-only memory and random-access memory. More specific examples of computer readable medium are tangible (and non-transitory) and include Flash memory, EEPROM memory, memory card, CD-ROM, DVD, hard drive, magnetic tape, and optical data storage device. The computer readable medium can also be distributed over network-coupled computer systems so that the computer readable code is stored and executed in a distributed fashion.

The advantages of various embodiments of the invention are numerous. Different aspects, embodiments or implementations may, but need not, yield one or more of the following advantages. One advantage of at least some embodiments is that power consumption of an electronic device can be reduced through adaptive frame rate control. Another advantage of at least some embodiments is that an application program operating on an electronic device can itself decide how to effectively reduce frame rate without substantially impacting output display quality. Still another advantage of at least some embodiments is that through intelligent frame rate control battery usage times for a portable electronic device are extended.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A method of controlling frame rate for dynamic data displayed on a display of a computing device, the method comprising:
evaluating data to be displayed, the data including a plurality of sequential blocks of data, and the evaluating including determining a degree of change in a current block of data from the plurality of sequential blocks based on comparing the current block of data to a prior block of data from the plurality of sequential blocks of data;
adaptively determining a frame rate to be used for displaying the current block of data when the degree of change exceeds a threshold value;
setting the frame rate to the determined frame rate;
displaying, in response to the setting of the frame rate, the current block of data on a display in accordance with the determined frame rate; and
repeating the evaluating, the determining, the setting and the displaying for subsequent blocks of the plurality of sequential blocks of data.

2. The method as recited in claim 1, wherein evaluating the data to be displayed includes determining an amount of motion or animation in the current block of data from the plurality of sequential blocks of data.

3. The method as recited in claim 2, wherein the determining and the setting are performed on a block-by-block basis.

4. The method as recited in claim 1, wherein the data to be displayed pertains to navigation data, and wherein the computing device include a GPS receiver for acquiring position data.

5. The method as recited in claim 4, wherein the data to be displayed is dependent on the position information.

6. The method as recited in claim 1, wherein evaluating the data to be displayed comprises evaluating curvature associated with the data to be displayed.

7. The method as recited in claim 1, wherein the computing device is a portable computing device.

8. The method as recited in claim 7, wherein the portable computing device comprises a mobile communication device.

9. The method as recited in claim 1, wherein adaptively determining and setting the frame rate on a block of data basis allows the frame rate to be reduced for those blocks of data that exhibit reduced movement, so that power consumption by display of such blocks of data at a reduced frame rate reduces power consumption of the computing device.

10. A method for controlling frame rate for dynamic data displayed on a display of a computing device, the method comprising:
setting a frame rate to a reduced frame rate;
evaluating data to be displayed, the data including a plurality of sequential blocks of data, and the evaluating including determining a degree of change in a current block of data from the plurality of sequential blocks based on comparing the current block of data to a prior block of data from the plurality of sequential blocks of data;
determining an enhanced frame rate to be used for displaying the current block of data when the degree of change exceeds a threshold value;
setting the frame rate to the enhanced frame rate; and
displaying, in response to the setting of the frame rate, the current block of data on a display in accordance with the set frame rate.

11. The method as recited in claim 10, wherein the reduced frame rate is less than or equal to one-half of the enhanced frame rate.

12. A method for controlling frame rate for dynamic data displayed on a display of a computing device, the method comprising:
launching a navigation application for operation on the computing device, the navigation application operates to present navigation information to a user of the computing device via a display, the navigation information including data to be displayed, and the data including a plurality of sequential blocks of data;
setting a frame rate for the display to a reduced frame rate;
obtaining a current block of data to be displayed on the display from the plurality of sequential blocks of data;
evaluating the current block of data to be displayed, the evaluating including determining a degree of change in the current block of data based on comparing the current block of data to a prior block of data from the plurality of sequential blocks of data;
determining an enhanced frame rate for the display when the degree of change exceeds a threshold value;
setting the frame rate for the display to the enhanced frame rate, the enhanced frame rate being greater than the reduced frame rate; and
displaying the current block of data on the display in accordance with the set frame rate.

13. The method as recited in claim 12, wherein the navigation information includes data to be displayed that graphically represents a portion of a directional route being taken from a departure position to an arrival position.

14. The method as recited in claim 13, wherein the data to be displayed that graphically represents the portion of the directional route being taken from the departure position to the arrival position includes descriptive information for a segment of at least one graphical object that is part of the data to be displayed.

15. The method as recited in claim 14, wherein the evaluating of the current block of data to be displayed includes evaluating curvature of at least one graphical object identified in the descriptive information.

16. The method as recited in claim 15, wherein the enhanced frame rate is dependent on the curvature.

17. The method as recited in claim 15, wherein the determining the enhanced frame rate for the display when the degree of change exceeds the threshold value comprises:
determining a degree of curvature associated with the least one graphical object; and
determining a frame rate to be used as the enhanced frame rate based on the degree of curvature.

18. The method as recited in claim 12, wherein the evaluating of the current block of data to be displayed includes evaluating an angular change in the navigation information.

19. The method as recited in claim 18, wherein the setting of the frame rate for the display to the enhanced frame rate is dependent on the angular change.

20. The method as recited in claim 18, wherein when the angular change is greater than a threshold amount, the frame rate is set to the enhanced frame rate.

21. The method as recited in claim 12, wherein the enhanced frame rate is at least twice the reduced frame rate.

22. The method as recited in claim 12, wherein the setting of the frame rate for the display to the enhanced frame rate comprises:
   selecting one of a plurality of enhanced frame rates; and
   setting the frame rate for the display to the selected one of the plurality of enhanced frame rates.

23. A non-transitory computer readable medium including at least computer program code stored therein for controlling frame rate for dynamic data to be displayed on a display associated with a computing device, the computer program code being executable by one or more processors to cause the one or more processors to:
   evaluate data to be displayed, the data including a plurality of sequential blocks of data, and the evaluating including determining a degree of change in a current block of data from the plurality of sequential blocks based on comparing the current block of data to a prior block of data from the plurality of sequential blocks of data;
   adaptively determine a frame rate to be used for displaying the current block of data when the degree of change exceeds a threshold value;
   set the frame rate to the determined frame rate; and
   display, in response to the setting of the frame rate, the current block of data on a display in accordance with the determined frame rate.

24. A portable electronic device, comprising:
   a display;
   a display controller operatively connected to the display, the display controller configured to control the display;
   a memory for storage of data, at least a portion of the data stored in the memory including executable computer code;
   a processor operatively connected to the memory and the display controller, the processor configured to execute the executable computer code; and
   a dynamic frame rate controller implemented in a portion of the executable computer code stored in the memory, the dynamic frame rate controller being configured to:
      evaluate data to be displayed, the data including a plurality of sequential blocks of data, and the evaluating including determining a degree of change in a current block of data from the plurality of sequential blocks based on comparing the current block of data to a prior block of data from the plurality of sequential blocks of data;
      adaptively determine a frame rate for displaying the current block of data when the degree of change exceeds a threshold value; and
      set the frame rate to the determined frame rate; and
   a battery providing power to the portable electronic device;
   wherein the display controller is configured to display the current block of data on the display in accordance with the determined frame rate,
   wherein the dynamic frame rate controller determines and sets the frame rate on a block of data basis such that the frame rate is reduced for those blocks of data that exhibit reduced movement, so that power consumption by display of such blocks of data at the reduced frame rate reduces power consumption of the portable electronic device and thereby extends battery life.

25. The portable electronic device as recited in claim 24, wherein the portable electronic device is a mobile telephone capable of executing computer program code.

* * * * *